No. 725,743. PATENTED APR. 21, 1903.
J. H. MILLS.
FLOOR AND WALL VENTILATOR AND REGISTER.
APPLICATION FILED MAY 10, 1902.
NO MODEL.
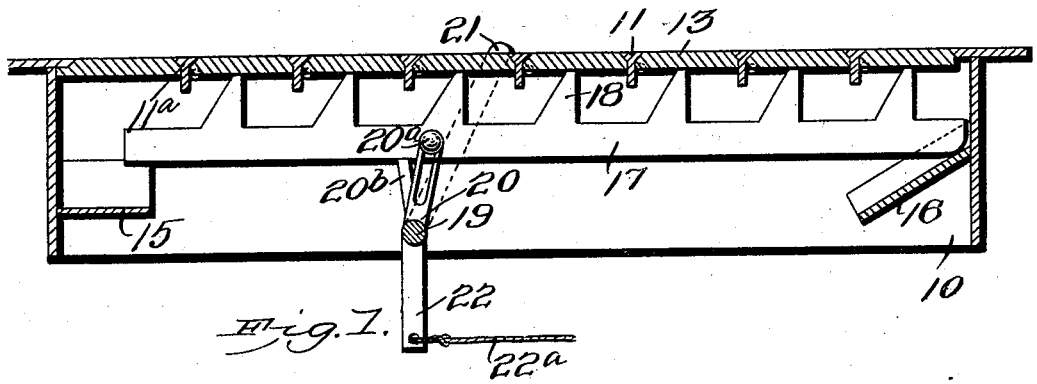
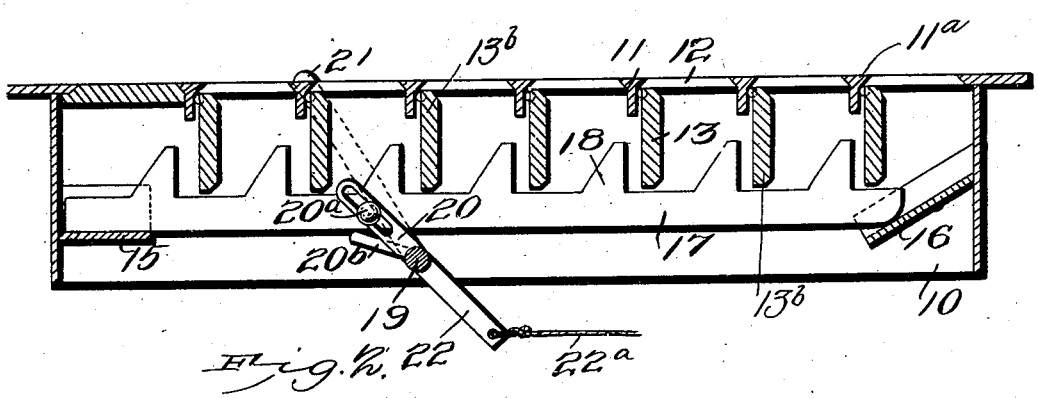
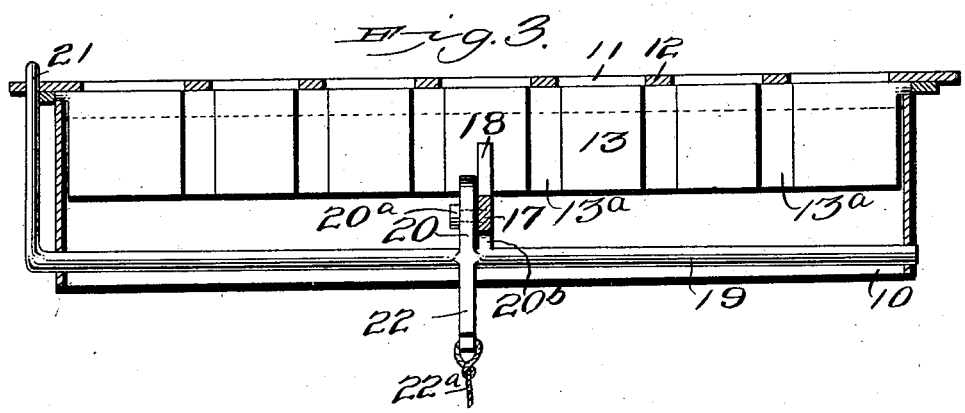
Witnesses
J. H. Mills, Inventor.
by
Attorneys

UNITED STATES PATENT OFFICE.

JOHN H. MILLS, OF GALESBURG, ILLINOIS.

FLOOR AND WALL VENTILATOR AND REGISTER.

SPECIFICATION forming part of Letters Patent No. 725,743, dated April 21, 1903.

Application filed May 10, 1902. Serial No. 106,815. (No model.)

*To all whom it may concern:*

Be it known that I, JOHN H. MILLS, a citizen of the United States, residing at Galesburg, in the county of Knox and State of Illinois, have invented a new and useful Floor and Wall Ventilator and Register, of which the following is a specification.

This invention relates to the ventilators and registers inserted in walls and ceilings for controlling the passage of heated air, and has for its object the production of a simple easily-operated device having valves so constructed and disposed that when closed they project into the interstices of the grating and present a uniform appearance, with the general surface of the valves and grating in the same plane.

Other novel features of the invention will appear in the annexed description and be specified in the claims following.

In the drawings illustrative of the invention, Figure 1 is a sectional elevation showing the valves closed, and Fig. 2 is a similar view showing the valves open. Fig. 3 is a transverse section on the line III III of Fig. 2.

The framework of the device is indicated at 10, adapted to be inserted in the opening in the wall or ceiling and provided with a grating formed of spaced bars 11 12, intersecting at right angles and producing a series of equal-sized square interstices.

The valves are indicated at 13, and consist of blades or slats hinged by their upper edges in the frame 10 and each formed with a series of transverse recesses 13ª, adapted when the valves are turned into their upward positions to embrace the bars 12, so that the portion of the valves between the recesses will project into the interstices in the grating and come flush with the outer surfaces of the bars. By this means when the valves are closed the whole exterior of the device, consisting of the outer portion of the frame 10, the valves 13, and the bars 11 and 12, will be in the same general plane and will present no projections or interstices. This is an important feature of the invention and provides a register-surface which will be uniform with the surrounding floor.

At one side, near the bottom of the casing 10, is formed a short horizontal guide 15, and on the opposite side is formed a short inclined guide 16, which guides are adapted to support an upwardly-movable bar 17, the bar resting on both of said guides when in lowered position and when in raised position resting on and engaging the inclined guide 16 only; it being then above and out of contact with the horizontal guide 15 and supported by the guide 16 and the elevating means hereinafter to be described. This bar 17 has a series of lugs 18 extending upward therefrom and corresponding in number to and engaging with the valves 13, each valve having one of the lugs adapted for engagement therewith, as shown in Figs. 1 and 2, for lifting them to and supporting them in elevated position.

Transversely disposed across the frame 10 beneath the bar 17 and near the guide 15 is an operating shaft or rod 19, provided with an upwardly-extending slotted arm 20. A pin 20ª on the bar 17 projects through and engages the slot of the arm 20 and is provided on its outer end with a head for holding it slidably in said slot. The shaft 19 is also provided with an operating-lever 21, which projects at its upper end above the general surface of the grating, so that it can be readily manipulated by the foot or hand of the operator. Extending from the shaft 19 and fixed thereto is another arm 20ᵇ, which is adapted to engage the under side of the bar 17 on the actuation of the shaft 19 and raise it into and support it in elevated position, whereby the valves are closed by the lugs carried by said bar 17. When the shaft 19 is rotated to the right, the end of the bar 17 nearest the arm 20ᵇ will be elevated thereby and the whole bar moved to the left by the action of the slotted arm 20, causing the other end of the bar to move upward upon the inclined guide 16, and thus maintain the bar in a constant horizontal plane, and thereby causing the lugs 18 to act uniformly upon the valves and move them into position, as shown in Fig. 1, to close the register, and then when the shaft is rotated in the opposite direction the lugs 18 will be released from their engagement with the valves 13, and said valves will fall by gravity into the position shown in Fig. 2, and thereby open the register. An arm 22 will extend from the shaft 19 to provide for the attachment of a cord 22ª, which will be led to any desired point, so that the register may be operated from any distance, or led over suitable carrier-pulleys to the damper in the hot-air pipe of a furnace, so that the furnace-damper may be actuated simultaneously with the register-valves. By this simple means the register-valves may be all readily opened and closed by the mere rotation of the shaft 19.

The bars 11 are formed with inwardly and downwardly inclined sides, and the edges of the valves 13 will be correspondingly beveled to adapt the valves when closed to closely engage the inclined edges of the bars 11 and insure a close joint between them.

The device may be applied to any of the various forms of register now in use or built in with registers specially constructed to receive it. It may be modified and changed in minor features without departing from the spirit of the invention or sacrificing any of its advantages.

While the grate-bars 11 are shown disposed at right angles in the drawings, it will of course be understood that they may be formed of any fanciful pattern or design and the recesses 13ª in the valves formed to correspond with the configuration of the grate-bars, so as to occupy the interstices between the grate-bars when closed, as in the drawings. I do not, therefore, wish to be limited to any special form of grate-bar configuration, as the device is applicable to any desired form.

Having thus described my invention, I claim—

1. In a device of the class described, a casing having a grate, a plurality of hinged valve-plates depending from said grate into the casing, a longitudinally-slidable bar having lugs to engage and support said plates, an inclined support for the front end of said bar, and means for sliding said bar in a forward direction and simultaneously elevating its rear end to the level attained by its front end.

2. In a device of the class described, a grating, valve-plates hinged with relation to said grating and adapted to close the apertures therein, an operating and supporting bar having lugs to engage said valve-plates to lift them to and support them in an elevated position, and means for imparting to said operating-bar a combined longitudinal and vertical movement.

3. In a device of the class described, a casing having a grate, a plurality of valves hinged with relation to said grate, a longitudinal operating and supporting bar having lugs to engage and support said valves, an inclined support for the front end of said bar, a horizontal support for the rear end thereof, and means for moving said bar in a forward direction and for supporting its rear end at the level at which it rests upon the inclined support of its front end.

4. A device of the class described comprising a grating, hinged valve-plates, an operating and supporting bar having lugs to engage the valves, an inclined support for the front end of said bar, a rock-shaft having a slotted arm engaging a pin projecting from said bar, and an arm extending from said rock-shaft and engaging the under side of the operating-bar.

In testimony that I claim the foregoing as my own I have hereto affixed my signature in the presence of two witnesses.

JOHN H. MILLS.

Witnesses:
G. B. CHURCHILL,
R. N. HEMENWAY.